May 15, 1928.  H. L. KLEIN  1,669,874

WINDSHIELD GLASS

Filed Sept. 21, 1923

Inventor:
Hugo L. Klein.
By: [signature] Atty.

Patented May 15, 1928.

1,669,874

UNITED STATES PATENT OFFICE.

HUGO L. KLEIN, OF CHICAGO, ILLINOIS, ASSIGNOR, BY MESNE ASSIGNMENTS, TO MISSISSIPPI GLASS COMPANY, OF NEW YORK, N. Y., A CORPORATION OF NEW YORK.

WINDSHIELD GLASS.

Application filed September 21, 1923. Serial No. 664,042.

My invention relates to glass and more particularly to glass for automobile wind shields or similar purposes.

It is the purpose of the invention to provide reinforcing members such as wires in an automobile wind shield that are of such a character that the same will not materially interfere with or obstruct the vision of the driver of the vehicle.

The glass can be used for other purposes than automobile wind shields, such as for windows in automobiles or other vehicles or in other places where danger of breakage of the glass exists but where it is desirable that clear vision can be obtained.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
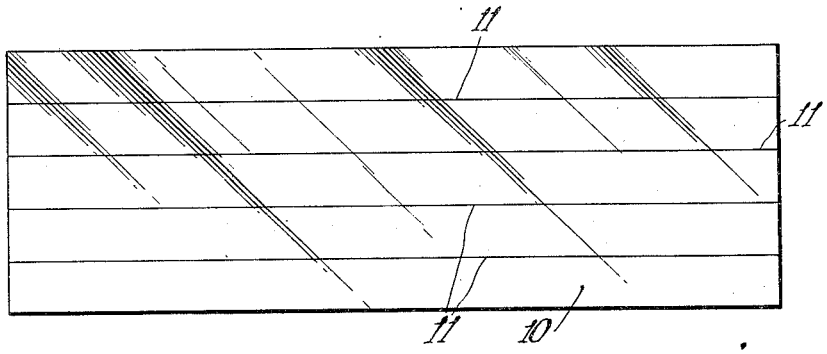
Fig. 1 is a plan view of a pane of glass made in accordance with my invention.
Figure 2:
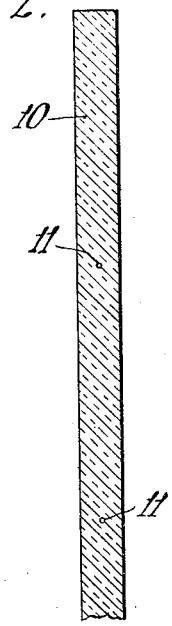
Fig. 2 is a fragmentary transverse sectional view enlarged thereof.

Referring in detail to the drawings, in Fig. 1 is shown a pane of glass 10 which is provided with reinforcing wires 11 therein, said wires 11 being arranged in substantial parallelism. The wires 11, as will be clear from Fig. 2, are embedded in the glass 10 when the glass is being manufactured, one way of making the same being to place the wires in position in the mold and cast the glass about the wires. The wires, it will be noted from Fig. 2, are very small compared with the thickness of the glass and said wires are held under at least sufficient tension to take all kinks out of the same so that the wires will lie stretched straight in the mold when the glass is poured. The exact amount of tension on the wires may be varied in accordance with conditions or to obtain the best result in practice. Preferably, the wires 11 are piano wire which is very strong for its size and can be stretched considerably without injury thereto. It is preferred that a fine wire be used which will not interfere with the vision of the person looking through the pane of glass but of sufficient strength so as to reinforce the glass along said wires.

Preferably, the wires extend horizontally in the wind shield glass and are spaced apart so that ordinarily none of the wires will interfere with the vision when the vehicle is in motion.

The pane of glass shown in Fig. 1 is intended to represent a pane of sufficient size for a wind shield and it will be evident that the wires 11 are spaced a considerable distance apart therein. The wires 11 will reinforce the glass so as to decrease the danger of fracture thereof and in case a fracture should occur the tendency will be for the glass to fracture along said reinforcing members 11, thus causing a clean straight fracture in the glass which will not cause any serious injury to a person thrown against the same or to a person against whom the glass falls.

Having thus described my invention, what I desire to claim and secure by United States Letters Patent is:

1. A vehicle window composed of reinforced glass having non-reticulated parallel strands of embedded reinforcing wire arranged in parallelism with the plane of the normal movement of the vehicle.

2. A vehicle window composed of reinforced glass, having non-reticulated embedded parallel strands of wire arranged horizontally.

In witness whereof, I hereunto subscribe my name this 14th day of September, A. D., 1923.

HUGO L. KLEIN.